(12) United States Patent
Grieco (10) Patent No.: US 8,782,972 B2
(45) Date of Patent: Jul. 22, 2014

(54) SOLAR ROOFING SYSTEM

(75) Inventor: William J. Grieco, New Albany, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 258 days.

(21) Appl. No.: 13/183,230

(22) Filed: Jul. 14, 2011

(65) Prior Publication Data

US 2013/0014455 A1 Jan. 17, 2013

(51) Int. Cl.
 *E04D 13/18* (2014.01)
 *E04H 14/00* (2006.01)

(52) U.S. Cl.
 USPC .................................................. 52/173.3

(58) Field of Classification Search
 USPC ................... 52/173.3; 136/251, 244
 See application file for complete search history.

(56) References Cited

U.S. PATENT DOCUMENTS

| | | |
|---|---|---|
| 2,005,335 A | 6/1935 | Clough |
| 2,018,722 A | 10/1935 | Humphrey |
| 2,034,602 A | 3/1936 | Anderson |
| 2,265,540 A | 12/1941 | Nichols |
| 2,284,705 A | 6/1942 | Wickersham |
| 2,378,027 A | 6/1945 | Murray |
| 2,687,701 A | 8/1954 | Abraham |
| 3,184,324 A | 5/1965 | Ryckman |
| 3,624,975 A | 12/1971 | Morgan et al. |
| 3,919,823 A | 11/1975 | Bradley |
| 4,239,555 A * | 12/1980 | Scharlack et al. ............ 136/251 |
| 4,321,416 A | 3/1982 | Tennant |
| 4,333,279 A | 6/1982 | Corbin et al. |
| 4,468,909 A | 9/1984 | Eaton |
| 4,527,374 A | 7/1985 | Corbin |
| 4,830,038 A * | 5/1989 | Anderson et al. ............ 136/251 |
| 4,860,509 A | 8/1989 | Laaly et al. |
| 4,886,554 A | 12/1989 | Woodring et al. |
| 4,900,589 A | 2/1990 | Montgomery |
| 4,922,670 A | 5/1990 | Naka et al. |
| 5,094,058 A | 3/1992 | Slocum |
| 5,241,370 A | 8/1993 | Desor |
| 5,425,214 A | 6/1995 | Truelove et al. |
| 5,437,735 A | 8/1995 | Younan et al. |
| 5,505,788 A | 4/1996 | Dinwoodie |
| 5,571,596 A | 11/1996 | Johnson |
| 5,575,861 A | 11/1996 | Younan et al. |
| 5,590,495 A * | 1/1997 | Bressler et al. ............ 52/173.3 |

(Continued)

FOREIGN PATENT DOCUMENTS

| | | |
|---|---|---|
| CN | 101828268 | 9/2010 |
| CN | 101922211 | 12/2010 |

(Continued)

OTHER PUBLICATIONS

International Search Report and Written Opinion from PCT/US12/46590 dated Oct. 5, 2012.

(Continued)

*Primary Examiner* — Brian Glessner
*Assistant Examiner* — Paola Agudelo
(74) *Attorney, Agent, or Firm* — Calfee, Halter & Griswold LLP (57) ABSTRACT

A solar roofing shingle assembly includes an attachment panel configured for attachment to a roof deck and a solar shingle mounted to the attachment panel.

17 Claims, 8 Drawing Sheets

(56) References Cited

U.S. PATENT DOCUMENTS

| | | | |
|---|---|---|---|
| 5,611,186 A | 3/1997 | Weaver | |
| 5,768,831 A * | 6/1998 | Melchior | 52/173.3 |
| 5,813,176 A | 9/1998 | Tzeng et al. | |
| 5,830,779 A | 11/1998 | Bressler et al. | |
| 5,986,203 A | 11/1999 | Hanoka et al. | |
| 5,990,414 A | 11/1999 | Posnansky | |
| 6,065,256 A | 5/2000 | Joko et al. | |
| 6,099,779 A | 8/2000 | Brandner et al. | |
| 6,105,331 A * | 8/2000 | Rinklake et al. | 52/650.1 |
| 6,111,189 A | 8/2000 | Garvison et al. | |
| 6,182,404 B1 | 2/2001 | Rinklake et al. | |
| 6,228,785 B1 | 5/2001 | Miller et al. | |
| 6,232,545 B1 | 5/2001 | Samaras et al. | |
| 6,311,436 B1 | 11/2001 | Mimura et al. | |
| 6,360,497 B1 | 3/2002 | Nakazima et al. | |
| 6,453,629 B1 | 9/2002 | Nakazima et al. | |
| 6,465,724 B1 | 10/2002 | Garvison et al. | |
| 6,489,552 B2 | 12/2002 | Yamawaki et al. | |
| 6,506,970 B2 | 1/2003 | Yamawaki | |
| 6,519,902 B1 | 2/2003 | Scisson | |
| 6,540,829 B2 | 4/2003 | Allman et al. | |
| 6,729,081 B2 | 5/2004 | Nath et al. | |
| 6,730,841 B2 | 5/2004 | Heckeroth | |
| 6,875,914 B2 | 4/2005 | Guha et al. | |
| 6,883,290 B2 | 4/2005 | Dinwoodie | |
| 6,924,015 B2 | 8/2005 | Zanchetta et al. | |
| 6,933,007 B2 | 8/2005 | Fensel et al. | |
| 6,959,517 B2 | 11/2005 | Poddany et al. | |
| 6,959,520 B2 | 11/2005 | Hartman | |
| 6,990,779 B2 | 1/2006 | Kiik et al. | |
| RE38,988 E | 2/2006 | Dinwoodie | |
| 7,012,188 B2 | 3/2006 | Erling | |
| 7,125,601 B1 | 10/2006 | Pinault et al. | |
| 7,178,295 B2 | 2/2007 | Dinwoodie | |
| 7,219,476 B2 | 5/2007 | Akins et al. | |
| 7,328,534 B2 | 2/2008 | Dinwoodie | |
| 7,365,266 B2 | 4/2008 | Heckeroth | |
| 7,387,537 B1 | 6/2008 | Daily et al. | |
| 7,445,508 B2 | 11/2008 | Daily et al. | |
| 7,455,899 B2 | 11/2008 | Gross et al. | |
| 7,487,771 B1 | 2/2009 | Eiffert et al. | |
| 7,509,775 B2 | 3/2009 | Flaherty et al. | |
| 7,531,740 B2 | 5/2009 | Flaherty et al. | |
| 7,557,291 B2 | 7/2009 | Flaherty et al. | |
| 7,587,864 B2 | 9/2009 | McCaskill et al. | |
| 7,592,537 B1 | 9/2009 | West | |
| 7,638,164 B2 | 12/2009 | Aschenbeck | |
| 7,642,449 B2 | 1/2010 | Korman et al. | |
| 7,678,990 B2 | 3/2010 | McCaskill et al. | |
| 7,678,991 B2 | 3/2010 | McCaskill et al. | |
| 7,713,089 B2 | 5/2010 | Faust et al. | |
| 7,748,196 B2 | 7/2010 | Gula et al. | |
| 7,810,286 B2 | 10/2010 | Eiffert et al. | |
| 7,832,176 B2 | 11/2010 | McCaskill et al. | |
| 7,836,654 B2 | 11/2010 | Belt et al. | |
| 7,858,874 B2 | 12/2010 | Ruskin et al. | |
| 7,882,677 B2 | 2/2011 | Jolitz et al. | |
| 7,900,407 B2 | 3/2011 | Plaisted et al. | |
| 7,918,694 B1 | 4/2011 | Stahl et al. | |
| 7,926,236 B2 | 4/2011 | Konstantin | |
| 7,987,641 B2 | 8/2011 | Cinnamon | |
| 8,003,882 B2 | 8/2011 | Pisklak et al. | |
| 8,033,857 B2 | 10/2011 | Nightingale et al. | |
| 8,065,844 B2 | 11/2011 | Botkin et al. | |
| D653,201 S | 1/2012 | Silliett et al. | |
| 8,088,990 B1 | 1/2012 | Tsai et al. | |
| 8,168,880 B2 | 5/2012 | Jacobs et al. | |
| 8,173,889 B2 | 5/2012 | Kalkanoglu et al. | |
| 8,215,070 B2 * | 7/2012 | Railkar et al. | 52/173.3 |
| 8,536,442 B2 * | 9/2013 | Stancel | 136/251 |
| 2001/0054435 A1 | 12/2001 | Nagao et al. | |
| 2003/0136073 A1 | 7/2003 | Von Arx et al. | |
| 2003/0152747 A1 | 8/2003 | Fensel et al. | |
| 2003/0154667 A1 | 8/2003 | Dinwoodie | |
| 2004/0000334 A1 | 1/2004 | Ressler | |
| 2004/0182032 A1 | 9/2004 | Koschitzky | |
| 2004/0187909 A1 | 9/2004 | Sato et al. | |
| 2005/0081909 A1 | 4/2005 | Paull | |
| 2005/0141153 A1 | 6/2005 | Mucci et al. | |
| 2006/0016136 A1 | 1/2006 | Moller, Jr. | |
| 2006/0042680 A1 | 3/2006 | Korman et al. | |
| 2006/0042682 A1 | 3/2006 | Wolfe et al. | |
| 2006/0107993 A1 | 5/2006 | Wilhelm Krokoszinski et al. | |
| 2006/0196128 A1 | 9/2006 | Duke | |
| 2006/0266405 A1 | 11/2006 | Lenox | |
| 2006/0266406 A1 | 11/2006 | Faust et al. | |
| 2007/0044410 A1 | 3/2007 | Kalkanoglu | |
| 2007/0054987 A1 | 3/2007 | Zanchetta et al. | |
| 2007/0074754 A1 | 4/2007 | Farquhar et al. | |
| 2007/0095388 A1 | 5/2007 | Mergola et al. | |
| 2007/0157963 A1 | 7/2007 | Metten et al. | |
| 2007/0181174 A1 | 8/2007 | Ressler | |
| 2007/0193618 A1 | 8/2007 | Bressler et al. | |
| 2007/0199590 A1 | 8/2007 | Tanaka et al. | |
| 2007/0283996 A1 | 12/2007 | Hachtmann et al. | |
| 2007/0294287 A1 | 12/2007 | Baek | |
| 2008/0006323 A1 | 1/2008 | Kalkanoglu et al. | |
| 2008/0053519 A1 | 3/2008 | Pearce et al. | |
| 2008/0066323 A1 | 3/2008 | Crain et al. | |
| 2008/0083176 A1 | 4/2008 | Barsun et al. | |
| 2008/0121270 A1 | 5/2008 | Mayer et al. | |
| 2008/0135088 A1 | 6/2008 | Corrales | |
| 2008/0135090 A1 | 6/2008 | Corrales | |
| 2008/0135092 A1 | 6/2008 | Corrales | |
| 2008/0135094 A1 | 6/2008 | Corrales | |
| 2008/0160804 A1 | 7/2008 | Daily et al. | |
| 2008/0190047 A1 | 8/2008 | Allen | |
| 2008/0245399 A1 | 10/2008 | DeLiddo | |
| 2008/0245405 A1 | 10/2008 | Garvison et al. | |
| 2008/0248242 A1 | 10/2008 | Shiao et al. | |
| 2008/0271773 A1 | 11/2008 | Jacobs et al. | |
| 2008/0271774 A1 | 11/2008 | Kalkanoglu et al. | |
| 2008/0289272 A1 | 11/2008 | Flaherty et al. | |
| 2008/0302030 A1 | 12/2008 | Stancel et al. | |
| 2008/0302031 A1 | 12/2008 | Bressler et al. | |
| 2008/0302408 A1 | 12/2008 | Bressler et al. | |
| 2008/0302409 A1 | 12/2008 | Bressler et al. | |
| 2008/0314434 A1 | 12/2008 | Khouri et al. | |
| 2009/0000221 A1 | 1/2009 | Jacobs et al. | |
| 2009/0000222 A1 | 1/2009 | Kalkanoglu et al. | |
| 2009/0000657 A1 | 1/2009 | Jacobs | |
| 2009/0014057 A1 | 1/2009 | Croft et al. | |
| 2009/0014058 A1 | 1/2009 | Croft et al. | |
| 2009/0044854 A1 | 2/2009 | Placer et al. | |
| 2009/0095339 A1 | 4/2009 | Nightingale | |
| 2009/0120484 A1 * | 5/2009 | Nightingale | 136/244 |
| 2009/0126782 A1 | 5/2009 | Krause et al. | |
| 2009/0133340 A1 | 5/2009 | Shiao et al. | |
| 2009/0133739 A1 | 5/2009 | Shiao et al. | |
| 2009/0133740 A1 * | 5/2009 | Shiao et al. | 136/251 |
| 2009/0159118 A1 | 6/2009 | Kalkanoglu et al. | |
| 2009/0178350 A1 | 7/2009 | Kalkanoglu et al. | |
| 2009/0194143 A1 | 8/2009 | Jacobs et al. | |
| 2009/0205270 A1 | 8/2009 | Shaw et al. | |
| 2009/0205704 A1 | 8/2009 | Flaherty et al. | |
| 2009/0223550 A1 | 9/2009 | Curtin et al. | |
| 2009/0241450 A1 | 10/2009 | Italiane et al. | |
| 2009/0242015 A1 | 10/2009 | Wattman et al. | |
| 2009/0249723 A1 | 10/2009 | Clark et al. | |
| 2009/0255573 A1 | 10/2009 | Taylor | |
| 2009/0272436 A1 | 11/2009 | Cheung | |
| 2009/0293863 A1 * | 12/2009 | Augenbraun et al. | 126/623 |
| 2009/0302500 A1 | 12/2009 | Haynes et al. | |
| 2009/0317593 A1 | 12/2009 | Smith et al. | |
| 2009/0320389 A1 | 12/2009 | White | |
| 2009/0320405 A1 | 12/2009 | Mccaskill et al. | |
| 2009/0324960 A1 | 12/2009 | Richir et al. | |
| 2010/0012167 A1 | 1/2010 | Milshtein et al. | |
| 2010/0018135 A1 | 1/2010 | Croft et al. | |
| 2010/0018569 A1 | 1/2010 | Mitchell et al. | |
| 2010/0043319 A1 | 2/2010 | Bennett | |
| 2010/0064605 A1 | 3/2010 | Corvaglia et al. | |
| 2010/0065107 A1 | 3/2010 | Nightingale et al. | |
| 2010/0101634 A1 | 4/2010 | Frank et al. | |

(56) References Cited

U.S. PATENT DOCUMENTS

| | | |
|---|---|---|
| 2010/0126564 A1 | 5/2010 | Salomoni et al. |
| 2010/0126651 A1 | 5/2010 | Gumm |
| 2010/0146878 A1 | 6/2010 | Koch et al. |
| 2010/0151198 A1 | 6/2010 | Khan |
| 2010/0180523 A1 | 7/2010 | Lena et al. |
| 2010/0192509 A1* | 8/2010 | Sieling et al. ............... 52/741.3 |
| 2010/0199584 A1 | 8/2010 | Kalkanoglu et al. |
| 2010/0236165 A1 | 9/2010 | Smith et al. |
| 2010/0242381 A1 | 9/2010 | Jenkins |
| 2010/0269888 A1 | 10/2010 | Johnston, Jr. |
| 2010/0281794 A1 | 11/2010 | Saillard |
| 2010/0282318 A1 | 11/2010 | Kalkanoglu et al. |
| 2010/0294339 A1 | 11/2010 | Hollars |
| 2010/0313499 A1 | 12/2010 | Gangemi |
| 2010/0313501 A1 | 12/2010 | Gangemi |
| 2010/0313928 A1 | 12/2010 | Rose et al. |
| 2010/0313941 A1 | 12/2010 | Huang et al. |
| 2010/0325976 A1 | 12/2010 | Degenfelder et al. |
| 2011/0000153 A1 | 1/2011 | Albert |
| 2011/0000535 A1 | 1/2011 | Davidson |
| 2011/0017278 A1 | 1/2011 | Kalkanoglu et al. |
| 2011/0030761 A1 | 2/2011 | Kalkanoglu et al. |
| 2011/0041428 A1 | 2/2011 | Posnansky |
| 2011/0041429 A1 | 2/2011 | Rummens et al. |
| 2011/0047902 A1 | 3/2011 | Cryar |
| 2011/0047929 A1 | 3/2011 | Cappelli |
| 2011/0048507 A1 | 3/2011 | Livsey et al. |
| 2011/0056148 A1 | 3/2011 | Jenkins et al. |
| 2011/0067327 A1 | 3/2011 | Eiffert et al. |
| 2011/0083381 A1 | 4/2011 | David et al. |
| 2011/0094170 A1 | 4/2011 | Kalkanoglu et al. |
| 2011/0094171 A1 | 4/2011 | Burkhardt et al. |
| 2011/0094560 A1 | 4/2011 | Keenihan et al. |
| 2011/0094568 A1 | 4/2011 | Keenihan et al. |
| 2011/0094570 A1 | 4/2011 | Boven et al. |
| 2011/0100436 A1 | 5/2011 | Cleereman et al. |
| 2011/0100438 A1 | 5/2011 | Gaston et al. |
| 2011/0108087 A1 | 5/2011 | Croft et al. |
| 2011/0114158 A1 | 5/2011 | Lenox |
| 2011/0132427 A1 | 6/2011 | Kalkanoglu et al. |
| 2011/0138710 A1 | 6/2011 | Reisdorf et al. |
| 2011/0138711 A1 | 6/2011 | Seng et al. |
| 2011/0139250 A1 | 6/2011 | Du et al. |
| 2011/0174365 A1 | 7/2011 | Frake et al. |
| 2011/0183540 A1 | 7/2011 | Keenihan et al. |
| 2011/0185650 A1 | 8/2011 | Kalkanoglu et al. |
| 2011/0185651 A1 | 8/2011 | Taylor |
| 2011/0185652 A1 | 8/2011 | Lenox |
| 2011/0185668 A1 | 8/2011 | Kiik et al. |
| 2011/0189433 A1 | 8/2011 | Kiik et al. |
| 2011/0197524 A1 | 8/2011 | Sahlin et al. |
| 2011/0197954 A1 | 8/2011 | Young et al. |
| 2011/0209420 A1 | 9/2011 | Roach et al. |
| 2011/0209421 A1 | 9/2011 | Arguelles |
| 2011/0209745 A1 | 9/2011 | Korman et al. |
| 2011/0220183 A1 | 9/2011 | Mills et al. |
| 2011/0225904 A1* | 9/2011 | Railkar et al. ............... 52/173.3 |
| 2011/0226305 A1 | 9/2011 | Chen et al. |
| 2011/0232220 A1 | 9/2011 | Belt et al. |
| 2011/0232737 A1 | 9/2011 | Ruletzki et al. |
| 2011/0232749 A1 | 9/2011 | Lienhart et al. |
| 2011/0239555 A1 | 10/2011 | Cook et al. |
| 2011/0249324 A1 | 10/2011 | Greer et al. |
| 2011/0271999 A1* | 11/2011 | Almogy et al. ............... 136/246 |
| 2011/0277821 A1 | 11/2011 | Cheng |
| 2011/0289867 A1 | 12/2011 | Balbo DiVinadio |
| 2011/0290296 A1 | 12/2011 | Daniel et al. |
| 2011/0290304 A1 | 12/2011 | Daniel |
| 2011/0297205 A1 | 12/2011 | Stevenson et al. |
| 2011/0308563 A1 | 12/2011 | Shufflebotham |
| 2012/0006397 A1 | 1/2012 | Gou et al. |
| 2012/0011783 A1 | 1/2012 | Jacobs et al. |
| 2012/0011784 A1 | 1/2012 | Shiao et al. |
| 2012/0017972 A1 | 1/2012 | Jenkins et al. |
| 2012/0023841 A1 | 2/2012 | Renna |
| 2012/0025618 A1 | 2/2012 | Erickson et al. |
| 2012/0110932 A1 | 5/2012 | Ehbing et al. |
| 2012/0118349 A1* | 5/2012 | Keenihan et al. ............ 136/244 |
| 2012/0118369 A1* | 5/2012 | Hedtke et al. ............... 136/256 |
| 2012/0204927 A1* | 8/2012 | Peterson et al. ............. 136/244 |

FOREIGN PATENT DOCUMENTS

| | | |
|---|---|---|
| CN | 102168475 | 8/2011 |
| DE | 19938554 | 2/2001 |
| DE | 202004005432 | 10/2004 |
| DE | 10358851 | 1/2005 |
| DE | 102005061709 | 3/2007 |
| DE | 102008026505 | 2/2010 |
| EP | 436572 | 11/1995 |
| EP | 1035591 | 9/2000 |
| EP | 1378010 | 2/2002 |
| EP | 1198012 | 4/2002 |
| EP | 1553639 | 7/2005 |
| EP | 2072708 | 6/2009 |
| EP | 2086019 | 8/2009 |
| EP | 2105971 | 9/2009 |
| EP | 2146160 | 1/2010 |
| EP | 2149646 | 2/2010 |
| EP | 2171769 | 4/2010 |
| EP | 2246902 | 11/2010 |
| EP | 2369266 | 9/2011 |
| FR | 2833033 | 6/2003 |
| FR | 2933999 | 1/2010 |
| FR | 2948709 | 2/2010 |
| FR | 2938567 | 5/2010 |
| FR | 2943369 | 9/2010 |
| FR | 2944304 | 10/2010 |
| FR | 2961539 | 12/2011 |
| GB | 2340993 | 3/2010 |
| GB | 2471172 | 12/2010 |
| JP | 2002-004485 | 1/2002 |
| JP | 4776087 | 11/2002 |
| JP | 2003-119962 | 4/2003 |
| JP | 2004-143910 | 5/2004 |
| JP | 3609744 | 10/2004 |
| JP | 2005-036604 | 2/2005 |
| JP | 3798578 | 7/2006 |
| JP | 3798579 | 7/2006 |
| JP | 3980265 | 9/2007 |
| JP | 4138697 | 8/2008 |
| JP | 4302826 | 7/2009 |
| JP | 2010-030263 | 2/2010 |
| JP | 4776087 | 9/2011 |
| KR | 2011-0034585 | 4/2011 |
| WO | 00/30184 | 5/2000 |
| WO | 01/99201 | 12/2001 |
| WO | 2006/082399 | 8/2006 |
| WO | 2007/138316 | 12/2007 |
| WO | 2008/052816 | 5/2008 |
| WO | 2009/018016 | 2/2009 |
| WO | 2009/043894 | 4/2009 |
| WO | 2009/046531 | 4/2009 |
| WO | 2009/071956 | 6/2009 |
| WO | 2009/074167 | 6/2009 |
| WO | 2009/108874 | 9/2009 |
| WO | 2010/026455 | 3/2010 |
| WO | 2010/049967 | 5/2010 |
| WO | 2010/079131 | 7/2010 |
| WO | 2010/111383 | 9/2010 |
| WO | 2010/112049 | 10/2010 |
| WO | 2010/124078 | 10/2010 |
| WO | 2010/125173 | 11/2010 |
| WO | 2010/140878 | 12/2010 |
| WO | 2011/002433 | 1/2011 |
| WO | 2011/004092 | 1/2011 |
| WO | 2011/023741 | 3/2011 |
| WO | 2011/093712 | 8/2011 |
| WO | 2011/116257 | 9/2011 |
| WO | 2011/153106 | 12/2011 |

(56) References Cited

FOREIGN PATENT DOCUMENTS

OTHER PUBLICATIONS

Bailey et al., "Long Term Field Teest Results of Experimental EPDM and PUF Roofing", US Army Corps of Engineers, USACERL Technical Report M-90/09, Apr. 1990, 51 pgs.

Jacobs et al., "Surface roughness effects on the solar reflectance of cool asphalt shingles", 2007, 16 page article.
Office action from U.S. Appl. No. 12/818,504 dated Nov. 14, 2011.
Office action from U.S. Appl. No. 12/818,504 dated Feb. 14, 2012.
Office action from U.S. Appl. No. 12/818,504 dated Aug. 8, 2012.
Notice of Allowance from U.S. Appl. No. 12/818,504 dated Apr. 17, 2013.

* cited by examiner

SOLAR ROOFING SYSTEM

BACKGROUND

Typical building applied photovoltaic (BAPV) and building integrated photovoltaic (BIPV) systems are labor intensive to install. An installer typically must attach brackets and frame rails to an existing roof deck over existing shingles and then mount the photovoltaic panels to the frame rails. In situations where the roof on a building is not relatively new; e.g. over ten years old, the BAPV system installer often must recommend that the roof be replaced concurrently with the installation of the BAPV system.

If the building roof is not replaced at the time the BAPV system is installed, a roof replacement later will require that the BAPV system be removed and reinstalled on the new roof, adding significant cost to the roof replacement. Some typical BIPV systems are nailed to the roof deck like a shingle, but are also installed in place of existing roof deck over existing shingles, and the building owner must also decide whether to replace the roof concurrently with installation of the BIPV system or risk having to remove and reinstall the BIPV system on a new roof.

The above notwithstanding, there remains a need in the art for an improved BIPV system.

SUMMARY OF THE INVENTION

The present application describes various embodiments of a solar roofing shingle assembly. One embodiment of the solar roofing shingle assembly includes an attachment panel configured for attachment to a roof deck and a solar shingle mounted to the attachment panel.

Other advantages of the solar roofing shingle assembly will become apparent to those skilled in the art from the following detailed description, when read in light of the accompanying drawings.

DETAILED DESCRIPTION

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The building integrated photovoltaic (BIPV) roofing shingle assembly of the invention described below provides a relatively low cost, easy to install, and aesthetically pleasing BIPV roofing shingle, ideal for use on building structure roofs, such as on sloped roof applications with conventional asphalt shingles.

Referring now to FIGS. 1 through 5, a first embodiment of a photovoltaic or solar roofing shingle assembly is shown generally at 10. In the illustrated embodiment, the solar roofing shingle assembly 10 includes a plurality of photovoltaic or solar roofing shingles 12 attached to a photovoltaic or solar roofing shingle attachment panel 14, hereinafter referred to as the attachment panel 14. The attachment panel 14 has a leading edge 14A, a trailing edge 14B, first end 14C (left end when viewing FIG. 4), a second end 14D (right end when viewing FIG. 4), a first surface 14E (the upwardly facing surface when installed on a roof), and a second surface or back side 14F, opposite the first surface 14E.

Figure 4:
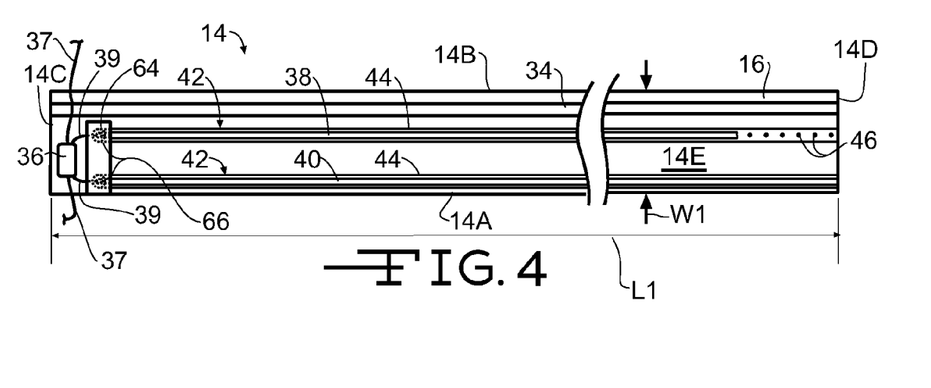
FIG. 4 is a plan view of a solar roofing shingle attachment panel illustrated in FIG. 1.
Figure 5:
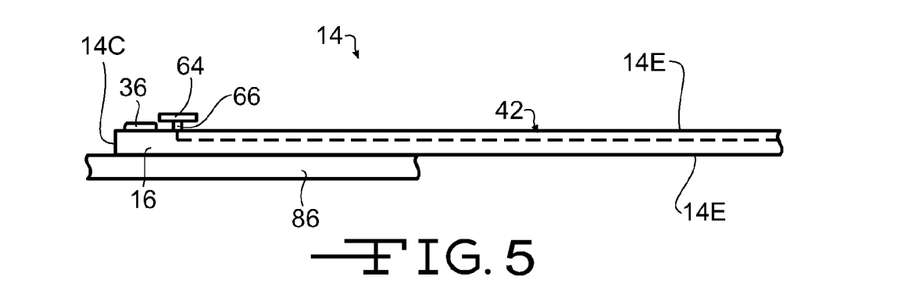
FIG. 5 is a front elevational view of the solar roofing shingle attachment panel illustrated in FIGS. 1 and 4, showing the substrate in exaggerated thickness.

The attachment panel 14 includes a substrate 16, shown with exaggerated thickness for clarity. In a first embodiment, the substrate 16 is formed from glass reinforced, polymer modified asphalt, such as is used to form a roofing shingle. In other embodiments, the substrate 16 may be formed from polymers, including but not limited to polyethylene, polypropylene, polyvinyl chloride, polycarbonate, acrylonitrile butadiene styrene (ABS), polystyrene, and nylon. Alternatively, the substrate 16 may be formed from fiberglass-reinforced polymers, including but not limited to polyethylene, polypropylene, polyvinyl chloride, polycarbonate, acrylonitrile butadiene styrene (ABS), polystyrene, and nylon.

The substrate 16 may have any desired size. In the illustrated embodiment, the substrate 16 has a length L1 of about 156.0 inches and a width W1 of about 18.0 inches. It will be understood that the length L1 and the width W1 of the substrate 16 define the length and width of the attachment panel 14. The illustrated attachment panel 14 is therefore configured to have four of the solar roofing shingles 12, described in detail below, attached. It will be further understood that the dimensions of solar roofing shingles may vary, and therefore the attachment panel 14 may have any other desired dimensions and be configured to have any desired number of solar roofing shingles attached. For example, the attachment panel 14 may have a length L1 within the range of from about 36.0 inches to about 360.0 inches. The attachment panel 14 may also have a length W1 within the range of from about 10.0 inches to about 24.0 inches.

Figure 6:
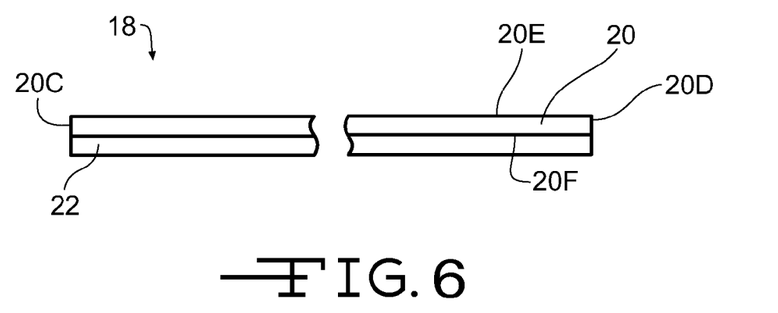
FIG. 6 is a front elevational view of a portion of a second embodiment of the attachment panel.

In the embodiment illustrated in FIGS. 4 and 5, the attachment panel 14 is shown as including a single layer of the substrate 16. Alternatively, the attachment panel 14 may include two layers of the substrate 16. As shown in FIG. 6, a second embodiment of the attachment panel is shown at 18 and includes a first substrate layer 20 defining the first surface 20E (the upwardly facing surface when installed on a roof). A second substrate layer 22 is substantially the same length as the first substrate layer 20 and is bonded to the backside 20F of the first substrate layer 20. Alternatively, the attachment panel 18 may include more than two layers of the substrate.

Figure 7:
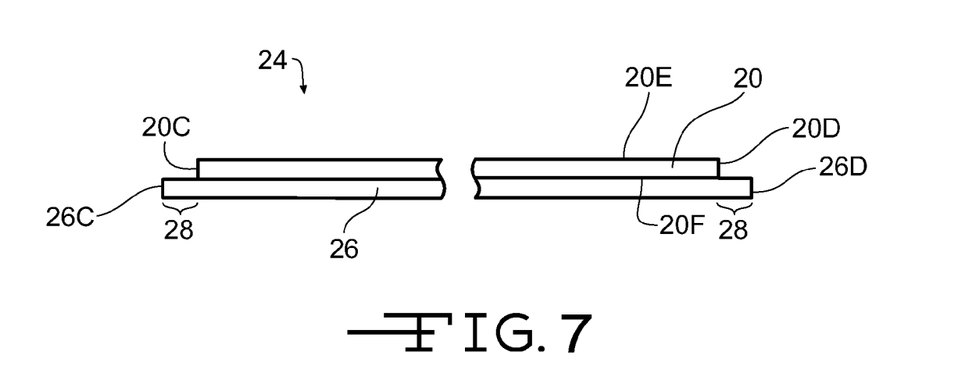
FIG. 7 is a front elevational view of a portion of a third embodiment of the attachment panel.

Referring to FIG. 7, a third embodiment of the attachment panel is shown at 24 and includes the first substrate layer 20 defining the first surface 20E. A second substrate layer 26 is bonded to the backside 20F of the first substrate layer 20. The second substrate layer 26 is longer than the first substrate layer 20, such that a first end 26C (left end when viewing FIG. 7), and a second end 26D (right end when viewing FIG. 7), of the second substrate layer 26 each extend outward of a first end 20C and a second end 20D of the first substrate layer 20, respectively, and define mounting members 28. In the illustrated embodiment, the first end 26C and the second end 26D may extend outward of the first end 20C and the second end 20D of the first substrate layer 20, respectively, by about 4.0 inches. Alternatively, the first end 26C and the second end 26D may extend outward of the first end 20C and the second end 20D of the first substrate layer 20 a distance within the range of about 1.0 inch to about 8.0 inches. The attachment panel 24 may also include more than two layers of the substrate.

Figure 8:
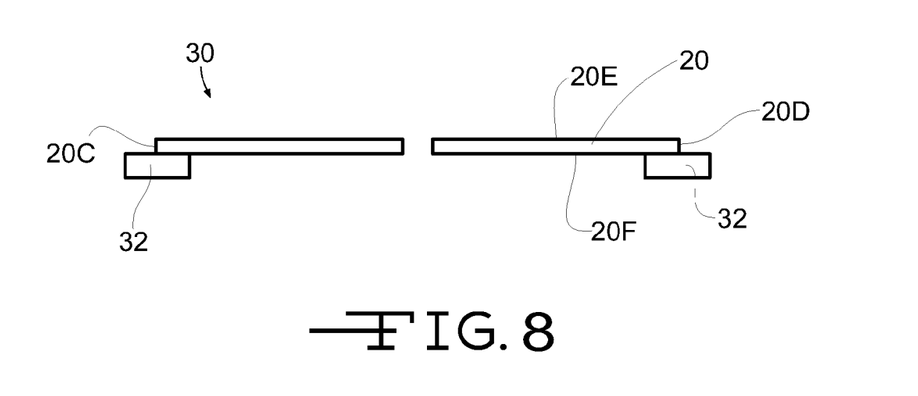
FIG. 8 is a front elevational view of a portion of a fourth embodiment of the attachment panel.

Referring to FIG. 8, a fourth embodiment of the attachment panel is shown at 30 and includes the first substrate layer 20 defining the first surface 20E. First and second portions of the substrate are bonded to the backside 20F of the first substrate layer 20 and define mounting members 32. The mounting members 32 may extend outward of the first end 20C and the second end 20D of the first substrate layer 20, respectively, by about 4.0 inches. Alternatively, the mounting members 32 may extend outward of the first end 20C and the second end 20D of the first substrate layer 20 a distance within the range of about 1.0 inch to about 8.0 inches. Alternatively, the attachment panel 30 may include more than two more layers of the first substrate layer 20. It will be understood that the attachment panels illustrated in FIGS. 6-8 are shown with components, such as the micro-inverter and bus bars, removed for clarity.

The attachment panel 14 may be attached to a roof in the same manner as a typical roofing shingle, and may include a reinforced nail zone 34 as disclosed in commonly assigned U.S. Pat. No. 7,836,654, and commonly assigned U.S. patent application Ser. No. 13/155,600, both of which are incorporated herein by reference.

An inverter 36 is mounted to the first surface 14E at the first end 14C of the attachment panel 14. In the illustrated embodiment, the inverter is a solar micro-inverter 36. As used in the description of the invention and the appended claims, the term "micro-inverter" is defined as a device that converts direct current (DC) from a single solar panel or solar panel array to alternating current (AC).

As shown in FIG. 4, electrical connectors 37, such as insulated wires, connect the micro-inverter 36 to the positive and negative DC bus bars 38 and 40, described below, adjacent micro-inverters 36, and the electrical panel (not shown) of the building to which the attachment panel or panels 14 are mounted. The micro-inverter 36 may be any micro-inverter, such as a 200 Watt micro-inverter. Alternately, a micro-inverter having a rating within the range of from about 100 W to about 500 W may also be used.

Bus bar channels 42 may be attached to, or formed in, the first surface 14E of the attachment panel 14. The bus bar channels may be configured as channel members mounted to the first surface 14E of the attachment panel 14, and configured to receive and provide a mounting surface for the DC bus bars 38 and 40. A first embodiment of the channel members are shown at 44 in FIGS. 4, 5, and 9. The channel member 44 includes a body defining a channel. In the illustrated embodiment, the channel member 44 is an elongated member having a substantially U-shaped cross section. Alternatively, the channel member 44 may be formed having a channel with any desired cross sectional shape.

Figure 9:
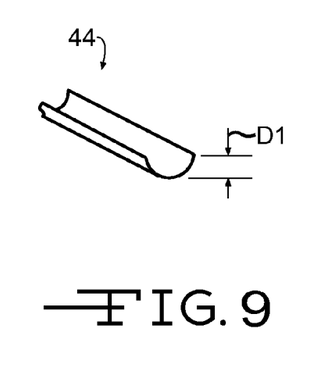
FIG. 9 is a perspective view of a first embodiment of the channel member illustrated in FIG. 4.

The channel members 44 may be attached to the first surface 14E of the attachment panel 14 by any desired means, such as with an adhesive or mechanical fasteners 46. Examples of suitable adhesives include but are not limited to the polymer modified asphalt of the substrate 16, polymer adhesives such as acrylic, silicone, and polyurethane adhesives, and elastomeric sealants such as acrylic, silicone, and polyurethane elastomeric materials. These adhesives may be cured under ambient conditions or with the assistance of thermal and/or electromagnetic radiation. Examples of suitable mechanical fasteners include but are not limited to rivets, screws, and entanglement materials, such as various hook and loop fastening materials.

Figure 10:
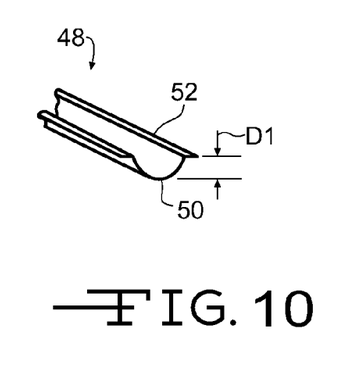
FIG. 10 is a perspective view of a second embodiment of the channel member.

A second embodiment of the channel member is shown at 48 in FIG. 10. The channel member 48 has an elongated body 50, having a substantially U-shaped cross section similar to the channel member 44, but includes longitudinally extending flanges 52. The channel members 48 may be attached to the first surface 14E of the attachment panel 14 by any desired means, such as with an adhesive or mechanical fasteners 46 which extend through the body 50 and/or the flanges 52.

Figure 11:
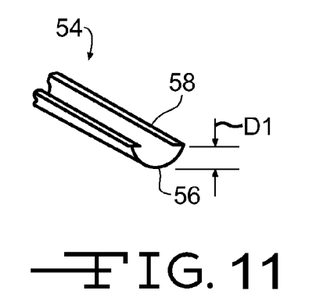
FIG. 11 is a perspective view of a third embodiment of the channel member.

A third embodiment of the channel member is shown at 54 in FIG. 11. The channel member 54 has an elongated body 56, having a substantially U-shaped cross section similar to the channel member 44, but includes longitudinally extending stepped portions defining inwardly extending shoulders 58. The channel member 54 may be attached to the first surface 14E of the attachment panel 14 by any desired means as described above.

The channel members 44, 48, and 54 may be formed from metal such as iron, steel, aluminum, copper, titanium, and other metals and metal alloys including those that include precious and/or corrosion resistant metals. Alternatively, the channel members 44, 48, and 54 may be formed from polymers such as polyethylene, polypropylene, polyvinyl chloride, polycarbonate, acrylonitrile butadiene styrene (ABS), polystyrene, and nylon, and from fiberglass-reinforced polymers, such as polyethylene, polypropylene, polyvinyl chloride, polycarbonate, acrylonitrile butadiene styrene (ABS), polystyrene, and nylon. The channel members 44, 48, and 54 may have any desired depth D1, such as a depth of about 0.25 inches. Alternatively, the channel members 44, 48, and 54 may have a depth D1 within the range of from about 0.05 inches to about 0.75 inches. The channel members 44, 48, and 54 may also have any other desired depth.

Figure 12:
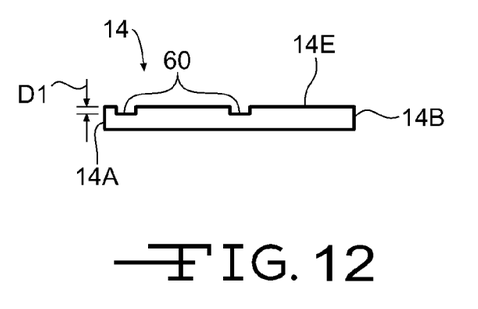
FIG. 12 is a side elevational view of a fifth embodiment of the attachment panel, showing the bus bar channels formed as grooves.

A fifth embodiment of the bus bar channels are shown in FIG. 12. In the embodiment illustrated in FIG. 12, the bus bar channels 42 are configured as elongated depressions or grooves 60 formed in the first surface 14E of the attachment panel 14. Like the channel members 44, 48, and 54, the grooves 60 are configured to receive and provide a mounting surface for the DC bus bars 38 and 40. The grooves 60 may have any desired depth D1, such as a depth of about 0.125 inches. Alternatively, the groove 60 may have a depth D1 within the range of from about 0.05 inches to about 0.70 inches. The groove 60 may also have any other desired depth.

Figure 13:
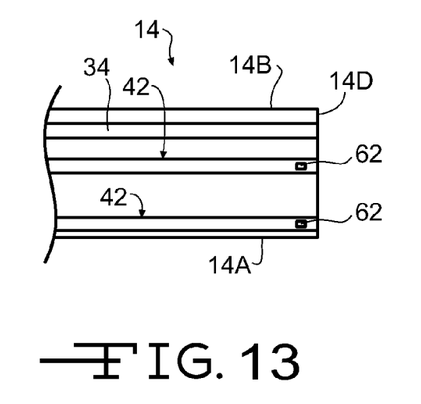
FIG. 13 is a plan view of a portion of the solar roofing shingle attachment panel illustrated in FIG. 1, showing electrical connectors in the channel members.

In the embodiment of the attachment panel 14 illustrated in FIG. 4, DC bus bars 38 and 40 are mounted within the bus bar channels 42. As shown, the bus bar 38 is a positive bus bar and the bus bar 40 is a negative bus bar. The bus bars 38 and 40 may be formed from any desired metal, such as copper, aluminum, and other metals and metal alloys including but not limited to those that include precious metals. Alternatively, the bus bars 38 and 40 may be configured as insulated wire, or a printed circuit. Additionally, electrical connectors 62, as shown schematically in FIG. 13, may be attached to the bus bars 38 and 40 for connecting to corresponding electrical contacts 74 of the solar roofing shingle 12. As described in detail below, the electrical contacts 74 of the solar roofing shingle 12 contact the positive and negative DC bus bars 38 and 40. The bus bars 38 and 40 may be attached to the bus bar channels 42 by any desired means, such as with an adhesive, the fasteners 46, or by mechanical or thermal bonding. The bus bars 38 and 40 are further connected to the micro-inverter 36 by a pair of electrical connectors 39.

An attachment member 64 is spaced apart from the first surface 14E of the attachment panel 14 and connected to the first surface 14E by pair of support posts 66. In the illustrated embodiment, the support posts 66 are substantially cylindrical. Alternatively, the support posts 66 may have any other desired shape. In the illustrated embodiment, the attachment member 64 is substantially flat and spaced apart from the first surface 14E of the attachment panel 14 a distance slightly larger than the thickness of the mounting flange 70 of the solar roofing shingle 12.

Figure 5A:
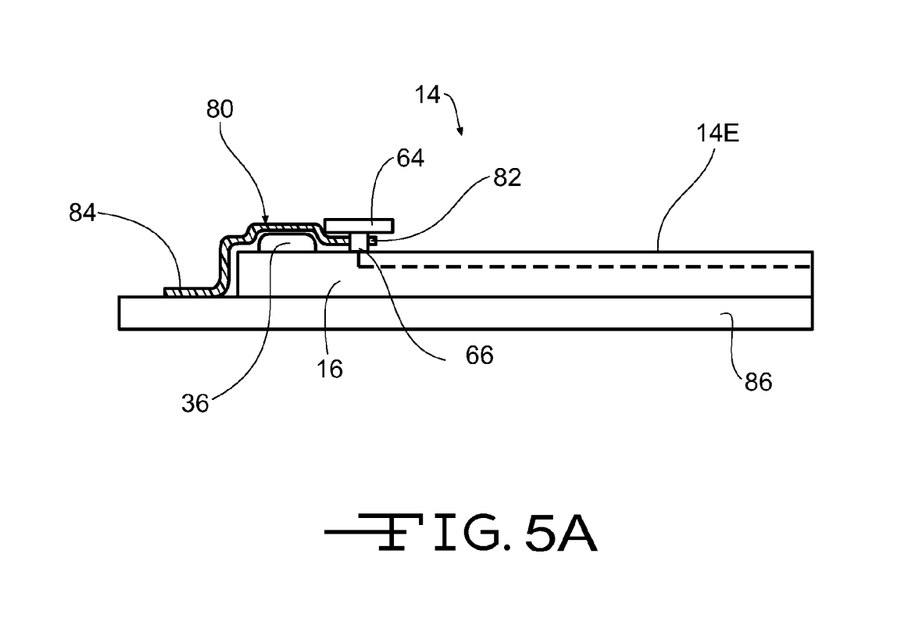
FIG. 5A is an enlarged front elevational view of a portion the solar roofing shingle attachment panel illustrated in FIG. 5, showing the attachment panel cover.

An attachment panel cover may be provided to cover the micro-inverter 36. In the embodiment illustrated in FIG. 5A, an attachment panel cover is shown at 80. The attachment panel cover 80 is molded or otherwise formed to fit closely to the micro-inverter 36 and the first surface 14E of the attachment panel 14. The attachment panel cover 80 includes a first flange 82 and a second flange 84. The attachment panel cover 80 may be mounted to the attachment panel 14 by inserting the first flange 82 into the space between the attachment member 64 and the first surface 14E of the attachment panel 14. If desired, the attachment panel cover 80 may include notches, such as the notches 72 that correspond to the support posts 66. The second flange 84 may extend outward (to the left when viewing FIG. 5A) and be attached to the roof deck 86 with any desired fastener, such as nails or staples. The second flange 84 may then be covered be a shingle in an adjacent course of shingles. The attachment panel cover 80 may be formed from metals, including but not limited to painted or otherwise-coated metals, such as steel, aluminum, and other metals and metal alloys. Alternatively, the attachment panel cover 80 may be formed from polymers, including but not limited to polyethylene, polypropylene, polyvinyl chloride, polycarbonate, acrylonitrile butadiene styrene (ABS), polystyrene, and nylon, and from fiberglass-reinforced polymers, including but not limited to polyethylene, polypropylene, polyvinyl chloride, polycarbonate, acrylonitrile butadiene styrene (ABS), polystyrene, and nylon.

In the illustrated embodiments, the micro-inverter 36 is shown mounted to the first surface 14E at the first end 14C of the attachment panel 14. Alternatively, the micro-inverter 36 may be mounted to the first surface 14E at the second end 14D of the attachment panel 14.

Figure 1:
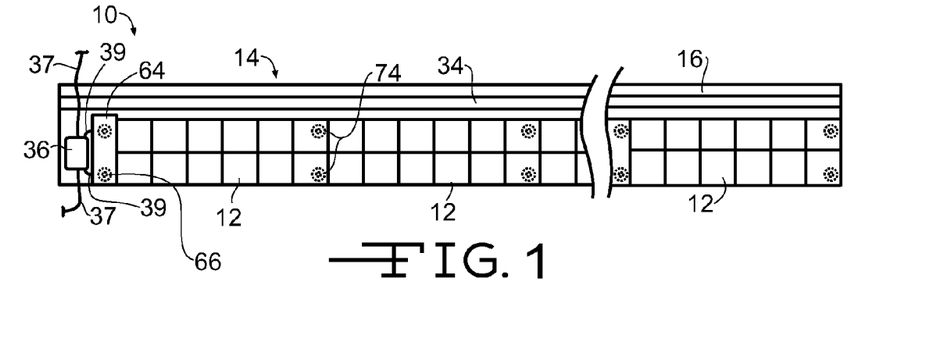
FIG. 1 is a plan view of a solar roofing shingle assembly according to the invention.
Figure 2:
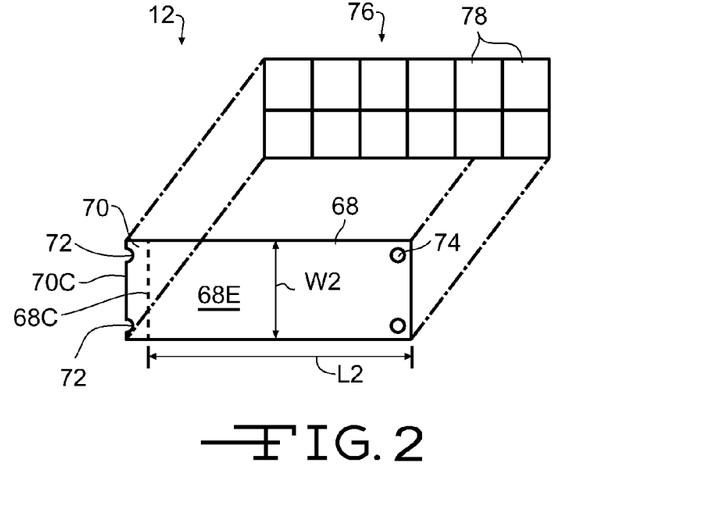
FIG. 2 is an exploded plan view of a solar roofing shingle illustrated in FIG. 1.
Figure 3:
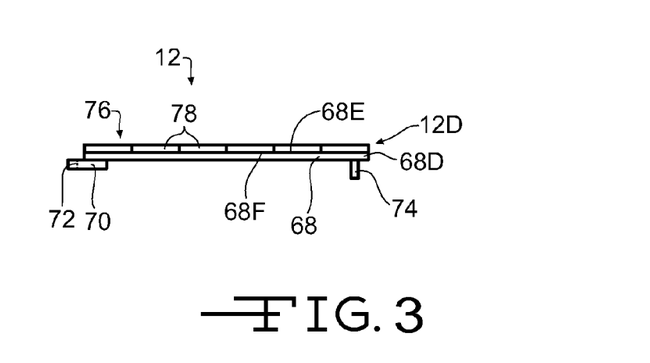
FIG. 3 is an elevational view of the solar roofing shingle illustrated in FIGS. 1 and 2.

Referring now to FIGS. 2 and 3, the illustrated solar roofing shingle 12 includes a shingle substrate 68. In a first embodiment, the shingle substrate 68 is formed from glass reinforced, polymer modified asphalt, such as is used to form a roofing shingle. In other embodiments, the shingle substrate 68 may be formed from polymers, including but not limited to polyethylene, polypropylene, polyvinyl chloride, polycarbonate, acrylonitrile butadiene styrene (ABS), polystyrene, and nylon.

The shingle substrate 68 may have any desired size. In the illustrated embodiment, the shingle substrate 68 has a length L2 of about 36.0 inches and a width W2 of about 12.0 inches. Alternately, shingle substrate 68 may have a length L2 within the range of from about 36.0 inches to about 42.0 inches. The shingle substrate 68 may also have a length W2 within the range of from about 12.0 inches to about 20.0 inches. As illustrated, the solar roofing shingle 12 has a size consistent with the size of a conventional roofing shingle.

In the illustrated embodiment, a mounting flange 70 is bonded to a backside 68F of the shingle substrate 68. The mounting flange 70 extends outward of the first end 68C of the shingle substrate 68 by about 4.0 inches. Alternatively, the mounting flange 70 may extend outward of the first end 68C of the shingle substrate 68 a distance within the range of about 2.0 inches to about 6.0 inches. The solar roofing shingle 12 may also include more than two layers of the shingle substrate 68. The mounting flange 70 may be formed from any of the materials described above for forming the shingle substrate 68 or from metals, including but not limited to steel, aluminum, and other metals and metal alloys. In the illustrated embodiment, the mounting flange 70 includes a pair of notches 72 formed in a first end 70C (left end when viewing FIG. 2) of the mounting flange 70.

Attachment members 74 extend through the shingle substrate 68 and outward of the backside 68F at the second end 68D of the shingle substrate 68. The attachment members 74 define electrical contacts 74.

In the embodiment of the solar roofing shingle 12 illustrated in FIG. 2, an array 76 of photovoltaic or solar cells 78 are mounted to a first surface 68E (the upwardly facing surface when installed on a roof) of the shingle substrate 68.

The solar cells 78 may be any desired solar cell, including solar cells formed from but not limited to single crystal silicon, polycrystalline silicon, amorphous silicon, thin film cadmium telluride (CdTe), thin film copper-indium-gallium-selenide (CIGS), dye-sensitized titania, and other photovoltaic material.

In the illustrated embodiment, an array of 12 photovoltaic or solar cells 78 (arranged six along the length L2 and two along the width W2 of the solar roofing shingle 12) are mounted to the first surface 68E of the shingle substrate 68. The solar cells 78 may be mounted or attached to the first surface 68E of the shingle substrate 68 by any desired means, such as with an adhesive or by thermal bonding. Each of the solar cells 78 are electrically connected to an adjacent solar cell 78, and the array 76 is electrically connected to the electrical contacts 74. If desired, additional electrical components and/or connectors may be mounted to the backside 68F of the shingle substrate 68. Examples of the additional electrical components include, but are not limited to, power electronics for monitoring solar cell performance, and any electrical connectors for connecting the solar cells 78 to each other and to the micro-inverter 36.

Figure 19:
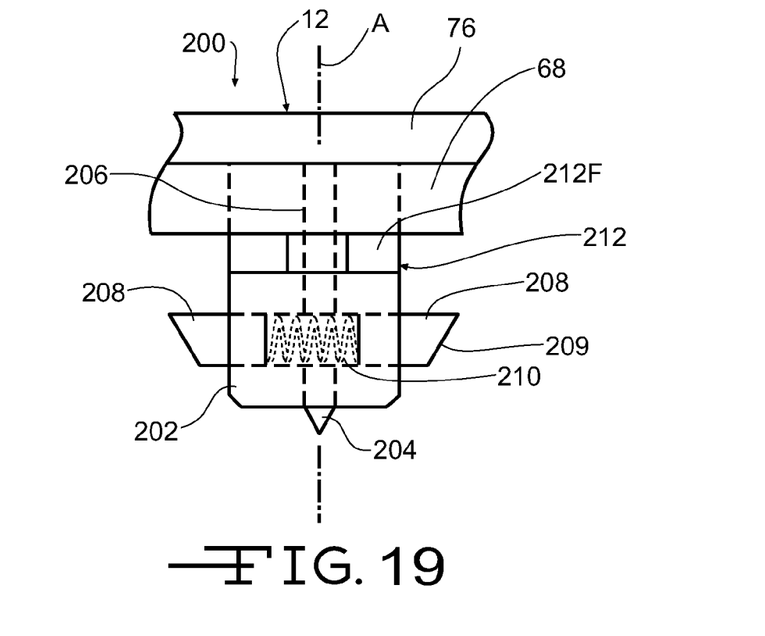
FIG. 19 is a side elevational view of a second embodiment of the electrical contacts.

The electrical contacts 74 may be any desired type of electrically conductive member that contacts the bus bars 38 and 40. Referring now to FIG. 19, a second embodiment of the electrical contact is illustrated at 200. The electrical contact 200 includes a body 202 having a longitudinal axis A. A contact member 204 extends longitudinally outwardly (downwardly when viewing FIG. 19) of the body 202. An electrical connector (not shown) connects the contact member 204 to the solar cells 78 of the array 76. In the illustrated embodiment, a longitudinally extending channel 206 is formed in the body 202 and defines a conduit for the electrical connector that connects the contact member 204 to the array 76. As shown in FIG. 19, the contact member 204 may include a sharpened end configured to pierce the insulation of insulated wire that may be used to define the bus bars 38 and 40.

Retention members or lugs 208 extend transversely outwardly of the body 202 and are coaxially mounted relative to each other. In the illustrated embodiment, the lugs 208 have a tapered end surface 209 to facilitate mounting the lugs 208 within the channel member 54. A biasing member urges the retention lugs 208 outward of each other and outward of the body 202. In the illustrated embodiment, the biasing member is a spring 210.

The spring biased lugs 208 retain the electrical contacts 200 within the channel members 54, and further retain the solar roofing shingle 12 to the attachment panel 14.

In the illustrated embodiment, the electrical contact 200 is configured to be rotated about the axis A relative the shingle substrate 68 so that the lugs 208 can be longitudinally aligned with the channel member 54 and removed from the attachment panel 14. A portion 212 of the outer surface of the body 202 may include flattened portions or facets 212F to provide engagement surfaces for a wrench or other tool to be used to rotate the electrical contact 200.

Figure 20:
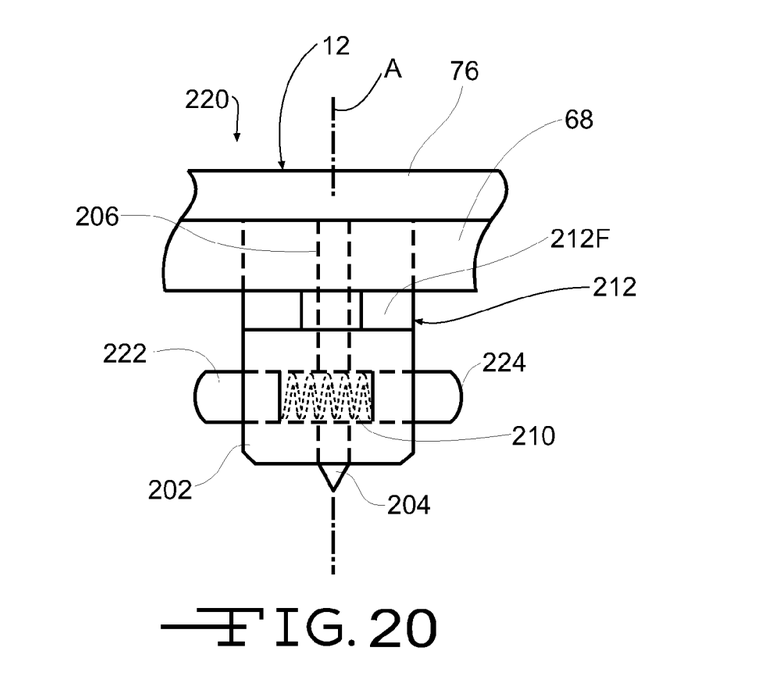
FIG. 20 is a side elevational view of a third embodiment of the electrical contacts.

Referring now to FIG. 20, and using like reference numbers to indicate corresponding parts, a third embodiment of the electrical contact is shown generally at 220. The electrical contact 220 is similar to the electrical contact 200, but includes retention members or lugs 222 extending transversely outwardly of the body 202. In the illustrated embodiment, the lugs 222 have a rounded end surface 224 to facilitate mounting the lugs 222 within the channel member 54. The spring 210 urges the retention lugs 222 outward of each other and outward of the body 202. The spring biased lugs 222 retain the electrical contacts 220 within the channel members 54, and further retain the solar roofing shingle 12 to the attachment panel 14.

The attachment panels 14 and solar roofing shingles 12 of the solar roofing shingle assembly 10 described above are advantageously easy for a roof installer to transport and install on a roof. Significantly, the solar roofing shingle assembly 10 may be installed on an existing roof or as part of a new shingle roof. In a first step of the installation process, the attachment panels 14 may be carried to a roof.

For each attachment panel 14 to be installed on an existing roof, a portion of one course of existing roofing shingles must be removed for a distance equal to the length of the attachment panel 14 plus at least one shingle adjacent each of the first second ends 14C and 14D of the attachment panel 14. Also, one horizontal course of existing roofing shingles must be removed above and below the attachment panel 14 or group of attachment panels 14. Any existing underlayment may then be removed to expose the roof deck 86, and any damage to the roof deck 86 may then be repaired. If desired, a new underlayment may be applied to the roof deck 86 in area to be covered by the solar roofing shingle assembly 10. In one embodiment, a waterproof underlayment is applied to the roof deck 86. Examples of suitable waterproof underlayments include ice and water barriers such WEATHERLOCK® self-sealing ice & water barrier products manufactured by Owens Corning. Alternatively, other ice & water barrier products may be used.

Figure 14:
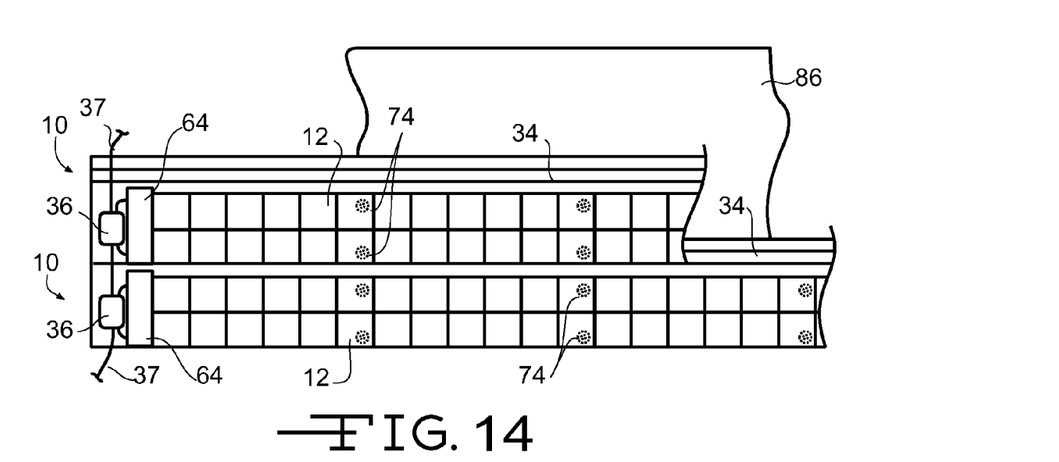
FIG. 14 is a plan view of a portion of two overlapping solar roofing shingle assemblies installed on a roof deck.

The installer may then attach a first attachment panel 14 to the roof deck 86 by driving nails through the reinforced nail zone 34. A second attachment panel 14 may then be attached to the roof deck 86 to define second course above the first attachment panel 14, as shown in FIG. 14. Additional attachment panels 14 may be attached to the roof deck 86 above the second and subsequently attached attachment panels 14 in the same manner.

Adjacent attachment panels 14 may be electrically connected together by the electrical connectors 37. Because adjacent attachment panels 14 are electrically connected to each other in a daisy chain, only one electrical connector 37 of one attachment panel 14 in the chain, typically the lower most attachment panel 14, must be connected to the electrical panel (not shown) of the building to which the attachment panels 14 are mounted. This creates the benefit of only requiring one access opening or hole in the roof deck 86 for one electrical connector 37.

Figure 15:
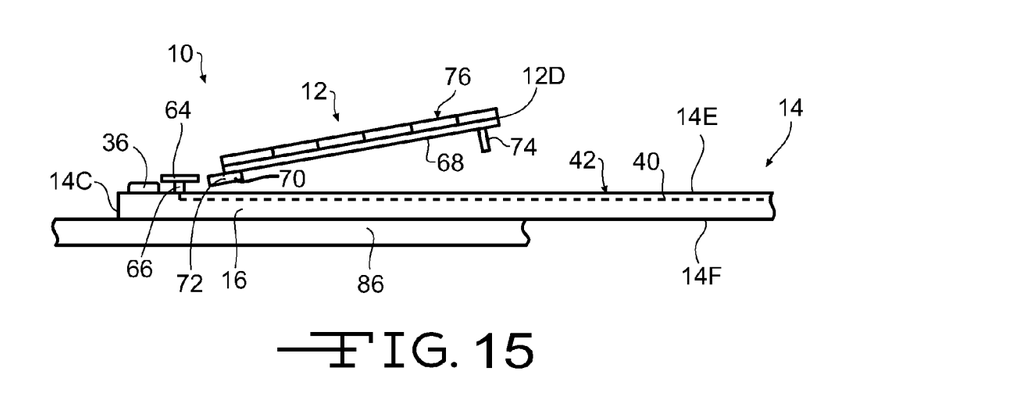
FIG. 15 is a side elevational view of the solar roofing shingle illustrated in FIGS. 2 and 3 being attached to the solar roofing shingle attachment panel illustrated in FIG. 4.
Figure 16:
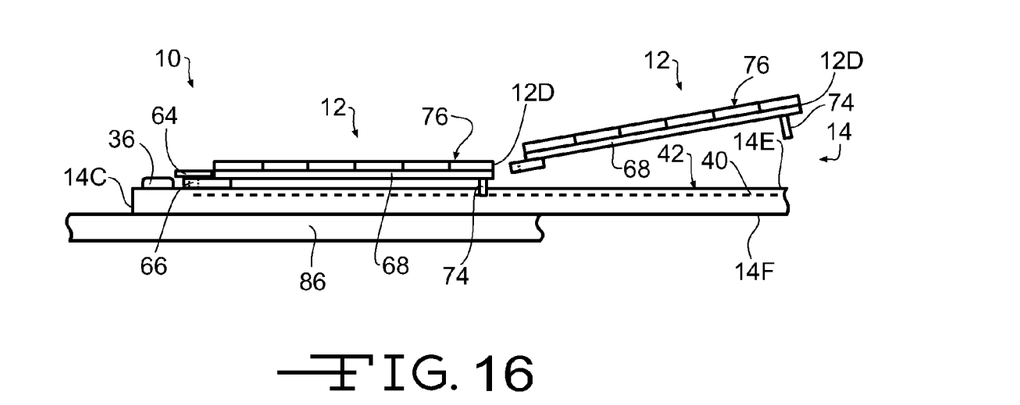
FIG. 16 is a side elevational view of a second solar roofing shingle being attached to first solar roofing shingle and the solar roofing shingle attachment panel illustrated in FIG. 15.

Once the attachment panels 14 are mounted to the roof deck 86, the solar roofing shingles 12 may be mounted or attached to the attachment panel 14. A first solar roofing shingle 12 may be mounted to the attachment panel 14 by inserting the mounting flange 70 into the space between the attachment member 64 and the first surface 14E of the attachment panel 14 until the notches 72 engage the support posts 66, as shown in FIG. 15. A second end 12D of the solar roofing shingles 12 may then be urged downwardly until the electrical contacts 74 contact the bus bars 38 and 40. In the illustrated embodiment, the spring loaded members of the electrical contacts 74 also retain the solar roofing shingle 12 to the attachment panel 14. When the electrical contacts 74 are seated in the bus bar channels 42, as shown in FIG. 16, the second end 12D of the solar roofing shingle 12 is spaced apart from the first surface 14E of the attachment panel 14. In the illustrated embodiment, the second end 12D of the solar roofing shingle 12 is spaced apart from the first surface 14E of the attachment panel a distance slightly larger than the thickness of the mounting flange 70 of the solar roofing shingle 12.

Second and subsequent solar roofing shingles 12 may be mounted to the attachment panel 14 in a similar manner by inserting the mounting flange 70 into the space between the second end 12D of a previously mounted adjacent solar roofing shingle 12 and the first surface 14E of the attachment panel 14 until the notches 72 engage the electrical contacts 74. A second end 12D of the second and subsequently mounted solar roofing shingles 12 may then be urged downwardly until the electrical contacts 74 contact the bus bars 38 and 40 and the solar roofing shingle 12 is retained in place relative to the attachment panel 14.

When the solar roofing shingle assembly 10 is installed on a new roof, the attachment panel 14 and the roofing shingles 12 may be mounted to the roof deck 86 in the manner described above. The cover panels 80 are then installed to complete the installation of the shingle assemblies 10. Roofing shingles may subsequently be mounted to the roof deck 86 in a known manner. Attachment panels 14 may be attached to a new roof according to the process described above.

Advantageously, when a building or structure having the inventive solar roofing shingle assembly 10 installed must be re-roofed, the solar roofing shingle assembly 10 may remain in place, thereby reducing the cost of the re-roofing project.

Figure 17:
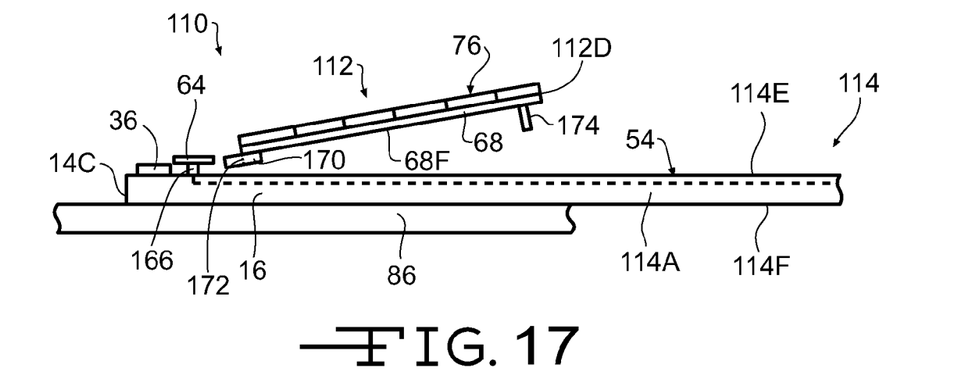
FIG. 17 is a side elevational view of a second embodiment of the solar roofing shingle assembly, showing a second embodiment of the solar roofing shingle being attached to a sixth embodiment of the solar roofing shingle attachment panel.
Figure 18:
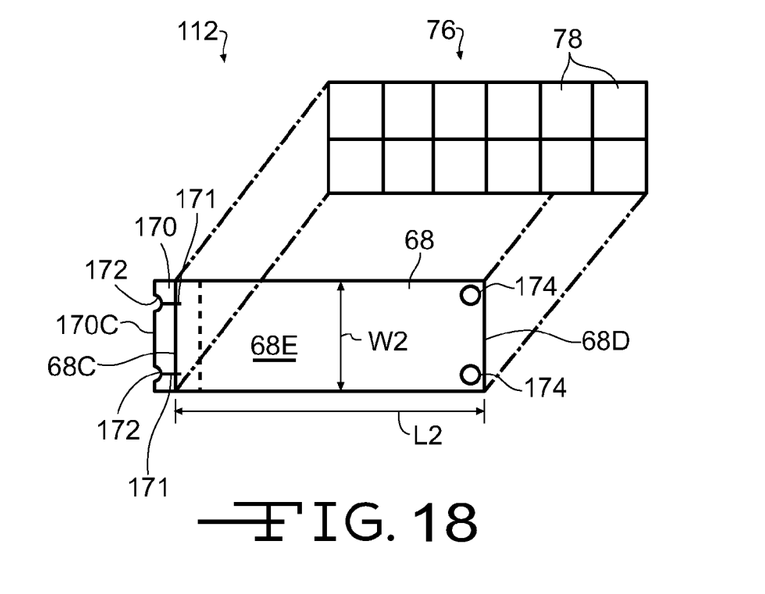
FIG. 18 is an exploded plan view of the solar roofing shingle illustrated in FIG. 17.

Referring now to FIGS. 17 and 18, and using like reference numbers to indicate corresponding parts, a second embodiment of a photovoltaic or solar roofing shingle assembly is shown generally at 110. In the illustrated embodiment, the solar roofing shingle assembly 110 includes a plurality of a second embodiment of the solar roofing shingles 112 attached to a sixth embodiment of the solar roofing shingle attachment panel 114.

The illustrated attachment panel 114 is similar to the roofing shingle attachment panel 14, but does not include bus bars. Rather, the posts 166 define positive and negative electrical connectors 166 and are further connected to the micro-inverter 36 by the electrical connectors 39, as shown in FIGS. 1 and 4. Additionally, the channels 54, as described above, are configured as mounting channels 54.

The attachment panel 114 also has a leading edge 114A, a trailing edge (not shown), first end 114C (left end when viewing FIG. 17), a second end (not shown), a first surface 114E (the upwardly facing surface when installed on a roof), and a second surface or back side 114F, opposite the first surface 114E.

Referring now to FIG. 18, the illustrated solar roofing shingles 112 is similar to the solar roofing shingles 12, and includes a mounting flange 170 bonded to a backside 68F of the shingle substrate 68. The mounting flange 170 includes a pair of notches 172 formed in a first end 170C (left end when viewing FIG. 18) of the mounting flange 170.

As described above, each of the solar cells 78 are electrically connected to an adjacent solar cell 78, and the array 76 is electrically connected to the electrical contacts 174. The notches 172 define positive and negative electrical connectors and are further connected to the array 76 of solar cells 78 by electrical connectors 171.

Attachment members 174 extend outward of the backside 68F at the second end 68D of the shingle substrate 68. The attachment members 174 define positive and negative electrical contacts 174, and are also connected to the array 76 of solar cells 78.

Figure 21:
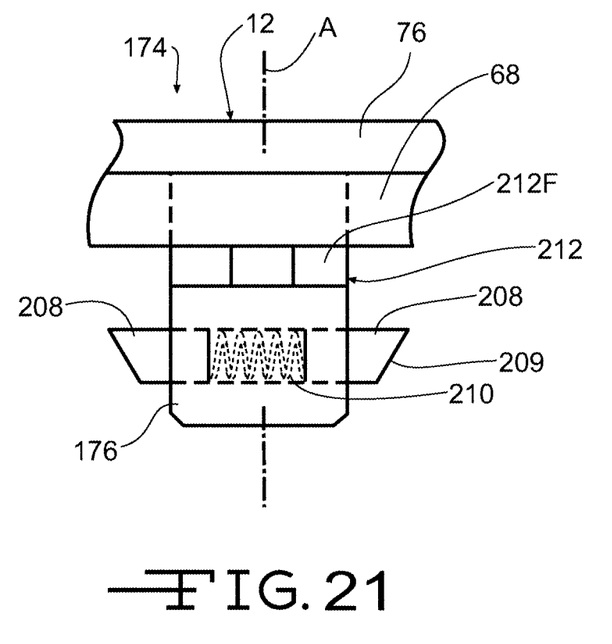
FIG. 21 is a side elevational view of a fourth embodiment of the electrical contacts.

Referring now to FIG. 21, and using like reference numbers to indicate corresponding parts, a fourth embodiment of the electrical contact is shown generally at 174. The electrical contact 174 is similar to the electrical contact 200, but includes an electrically conductive body 176. The electrically conductive body 176 is electrically connected to the solar cells 78 of the array 76. In the illustrated embodiments, the lugs 208 are shown. Alternatively, the lugs 222 may also be used with the electrical contact 174. As described above, spring biased lugs 208 retain the electrical contacts 174 within the channel members 54, and further retain the solar roofing shingle 12 to the attachment panel 14.

One or more attachment panels 114 may be attached to the roof deck 86 in the manner described above. Once the attachment panels 114 are mounted to the roof deck 86, the solar roofing shingles 112 may be mounted or attached to the attachment panel 114. A first solar roofing shingle 112 may be mounted to the attachment panel 114 by inserting the mounting flange 170 into the space between the attachment member 64 and the first surface 114E of the attachment panel 114 until the notches 172 engage the electrical connectors 166, as shown in FIG. 17. A second end 112D of the solar roofing shingles 112 may then be urged downwardly until the electrical contacts 174 contact the mounting channels 54.

In the illustrated embodiment, the electrical contacts 174 also retain the solar roofing shingle 112 to the attachment panel 114. When the electrical contacts 174 are seated in the mounting channels 54, the second end 112D of the solar roofing shingle 112 is spaced apart from the first surface 114E of the attachment panel 114. The second end 112D of the solar roofing shingle 112 may be spaced apart from the first surface 114E of the attachment panel a distance slightly larger than the thickness of the mounting flange 170 of the solar roofing shingle 112.

Second and subsequent solar roofing shingles 112 may be mounted to the attachment panel 114 in a similar manner by inserting the mounting flange 170 into the space between the second end 112D of a previously mounted adjacent solar roofing shingle 112 and the first surface 114E of the attachment panel 114 until the notches 172 engage the electrical contacts 174. A second end 112D of the second and subsequently mounted solar roofing shingles 112 may then be urged downwardly until the electrical contacts 174 contact the mounting channels 54 and the solar roofing shingle 112 is retained in place relative to the attachment panel 114.

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A solar roofing shingle assembly comprising:
   an attachment panel configured for attachment to a roof deck, the attachment panel including a substrate, and an attachment member mounted to a first surface of the attachment panel substrate; and a solar shingle including a shingle substrate, a solar cell mounted to a first surface of the shingle substrate, and a mounting flange bonded to a backside of the shingle substrate opposite the first surface, the mounting flange extending longitudinally outward from a first longitudinal end of the shingle substrate;

wherein the mounting flange is received between the attachment member and the first surface of the attachment panel substrate to mount the solar shingle to the attachment panel;

wherein the attachment panel substrate includes a first substrate layer and a second substrate layer bonded to a backside of the first substrate layer;

wherein the second substrate layer is longer than the first substrate layer, such that one of a first and a second end of the second substrate layer extends outward of a respective first and second end of the first substrate layer; and wherein the one of the first and second ends of the second substrate layer defines a mounting member.

2. The solar roofing shingle assembly according to claim 1, wherein the attachment panel substrate includes at least one of polymer modified asphalt, glass reinforced polymer modified asphalt, and a polymer.

3. The solar roofing shingle assembly according to claim 2, wherein the attachment panel includes at least two layers of the substrate.

4. The solar roofing shingle assembly according to claim 1, wherein the attachment panel substrate has a length within the range of from about 36.0 inches to about 360.0 inches and a width within the range of from about 10.0 inches to about 24.0 inches.

5. The solar roofing shingle assembly according to claim 1, wherein the attachment panel further including an inverter mounted to the first surface and electrically connected to the solar shingle.

6. The solar roofing shingle assembly according to claim 5, wherein the inverter is a solar micro-inverter.

7. The solar roofing shingle assembly according to claim 6, wherein the solar micro-inverter has a power output rating within the range of from about 100 W to about 500 W.

8. The solar roofing shingle assembly according to claim 5, wherein the first surface of the substrate further includes a bus bar mounted to the first surface and electrically connecting the solar shingle and the inverter.

9. The solar roofing shingle assembly according to claim 8, wherein the first surface of the substrate further includes a bus bar channel; and wherein the bus bar is mounted within the bus bar channel.

10. The solar roofing shingle assembly according to claim 9, wherein the bus bar channel is an elongated member having a body defining a channel, the elongated member mounted to the first surface; and wherein the bus bar is mounted within the elongated member.

11. The solar roofing shingle assembly according to claim 9, wherein the bus bar channel is defined by a groove formed in the first surface; and wherein the bus bar is mounted within the groove.

12. The solar roofing shingle assembly according to claim 8, wherein the solar shingle further includes an electrical contact extending outward of the backside of the shingle substrate, the electrical contact electrically connecting the bus bar and the inverter.

13. The solar roofing shingle assembly according to claim 1, wherein the solar shingle substrate includes at least one of polymer modified asphalt, glass reinforced polymer modified asphalt, and a polymer.

14. The solar roofing shingle assembly according to claim 1, wherein the solar shingle substrate has a length within the range of from about 36.0 inches to about 42.0 inches and a width within the range of from about 12.0 inches to about 20.0 inches.

15. The solar roofing shingle assembly according to claim 1, wherein the solar cell includes at least one of single crystal silicon, polycrystalline silicon, amorphous silicon, thin film cadmium telluride (CdTe), thin film copper-indium-gallium-selenide (CIGS), and dye-sensitized titania.

16. A solar roofing shingle assembly comprising: an attachment panel configured for attachment to a roof deck;

a plurality of solar shingles mounted to the attachment panel; and an inverter electrically connected to the solar shingles;

wherein the attachment panel includes a substrate having a first surface upon which the solar shingles and the inverter are mounted;

wherein each of the plurality of solar shingles includes a shingle substrate having a first surface upon which a plurality of solar cells are mounted, and a backside opposite the first surface;

wherein the substrate further includes a bus bar mounted to the first surface and electrically connecting the solar shingles and the inverter; and wherein each of the plurality of solar shingles further includes an electrical contact extending outward of the backside of the shingle substrate, the electrical contact electrically connected to the bus bar;

wherein each of the plurality of solar shingles further includes a mounting flange bonded to the backside of the shingle substrate, the mounting flange extending longitudinally outward from a first longitudinal end of the shingle substrate, wherein the mounting flange engages the electrical contact of an adjacent one of the plurality of solar shingles.

17. A solar roofing shingle assembly comprising:

an attachment panel configured for attachment to a roof deck;

a plurality of solar shingles mounted to the attachment panel; and an inverter electrically connected to the solar shingles;

wherein the attachment panel includes a substrate having a first surface upon which the solar shingles and the inverter are mounted;

wherein each of the plurality of solar shingles includes a shingle substrate having a first surface upon which a plurality of solar cells are mounted, and a backside opposite the first surface; and wherein each of the plurality of solar shingles further includes a first longitudinal end and a second longitudinal end, the first longitudinal end electrically connected to one of the attachment panel and the second longitudinal end of an adjacent solar shingle by a mounting flange bonded to the backside of the shingle substrate and extending longitudinally outward from a first longitudinal end of the shingle substrate, and the second longitudinal end including an electrical contact extending outward of the backside of the shingle substrate and configured for electrical connection to the mounting flange of an adjacent solar shingle.

* * * * *